(12) United States Patent
Nakagawa

(10) Patent No.: US 6,720,395 B2
(45) Date of Patent: *Apr. 13, 2004

(54) METHOD FOR PRODUCING A STELLAR POLYMER

(75) Inventor: Yoshiki Nakagawa, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/193,583

(22) Filed: Jul. 12, 2002

(65) Prior Publication Data

US 2002/0188080 A1 Dec. 12, 2002

Related U.S. Application Data

(63) Continuation of application No. 09/463,622, filed as application No. PCT/JP98/03350 on Jul. 28, 1998.

(30) Foreign Application Priority Data

Jul. 28, 1997 (JP) .............................................. 9-201346

(51) Int. Cl.[7] .............................. C08F 8/00; C08F 4/32; C08F 4/50; C08F 4/80; C08F 12/00; C08F 14/18; C08F 20/00; C08F 30/08; C08F 297/06

(52) U.S. Cl. ..................... 526/135; 526/145; 526/146; 526/147; 525/316; 525/242; 525/247; 525/313; 525/314; 525/305

(58) Field of Search ................................. 526/135, 145, 526/146, 147; 525/316, 242, 247, 313, 314, 305

(56) References Cited

U.S. PATENT DOCUMENTS

| 3,725,370 A | 4/1973 | Halasa et al. |
|---|---|---|
| 4,503,188 A | 3/1985 | Mancinelli |
| 5,006,623 A | 4/1991 | Watanabe et al. |
| 5,260,377 A | 11/1993 | Weber et al. |
| 5,328,956 A | 7/1994 | Hasebe et al. |
| 5,763,548 A | 6/1998 | Matyjaszewski et al. |
| 5,789,487 A | 8/1998 | Matyjaszewski et al. |
| 5,807,937 A | 9/1998 | Matyjaszewski et al. |
| 5,986,014 A | 11/1999 | Kusakabe et al. |
| 6,288,173 B1 | 9/2001 | Schimmel et al. |
| 6,407,187 B1 * | 6/2002 | Matyjaszewski et al. ..... 526/89 |
| 6,479,584 B1 * | 11/2002 | Nakagawa et al. ......... 525/100 |
| 6,512,060 B1 * | 1/2003 | Matyjaszewski et al. ... 526/111 |

FOREIGN PATENT DOCUMENTS

| DE | 3924047 A1 | 1/1991 |
|---|---|---|
| DE | 4137215 A1 | 5/1992 |
| EP | 0127907 | 12/1984 |
| EP | 0408420 A1 | 1/1991 |
| GB | 1374464 | 11/1974 |
| JP | 04-045105 A | 2/1992 |
| JP | 04-178407 A | 6/1992 |
| JP | 07-053630 A | 2/1995 |
| JP | 08-143678 A | 6/1996 |
| JP | 08-283310 A | 10/1996 |
| JP | 10-152513 A | 6/1998 |
| WO | WO 96/30421 | 10/1996 |
| WO | WO 97/18247 | 5/1997 |

* cited by examiner

Primary Examiner—D. R. Wilson
(74) Attorney, Agent, or Firm—Connolly Bove Lodge & Hutz, LLP

(57) ABSTRACT

A method of producing a stellar polymer which comprises polymerizing a vinyl monomer in the manner of living radical polymerization and adding a compound having two or more polymerizable carbon-carbon double bonds at the end point of the polymerization is provided. A composition which comprises, as an essential component, a hydroxyl-terminated polymer falling under said polymer and a compound having, in each molecule, not less than two functional groups reactive with the hydroxyl group is provided.

17 Claims, No Drawings

METHOD FOR PRODUCING A STELLAR POLYMER

This application is a continuation of application Ser. No. 09/463,622 filed Apr. 21, 2000 entitled, POLYMERS AND PROCESS FOR PRODUCING POLYMERS, which is a National Phase Application of PCT/JP98/03350 filed Jul. 28, 1998, which claims priority of Japanese application no. 9/201346 filed Jul. 28, 1997.

TECHNICAL FIELD

The present invention relates to a vinyl polymer having an extended chain or a stellar structure, a method of producing the same, and a composition comprising said polymer.

BACKGROUND ART

A stellar polymer is a polymer comprising a central portion and linear polymer arms radially extending therefrom and is known to have various properties differentiating itself from linear polymers. The methods of producing stellar polymers are roughly classified into two groups. In one group, polymer arms are grown from a compound constituting the center and, in the other, polymer molecules to constitute arms are first produced and then joined together to form a stellar form. As a method usable for joining the arms, there can be mentioned the method comprising reacting the arms with a compound having a plurality of functional groups capable of reacting with the terminal functional groups of the arms and the method comprising adding a compound having a plurality of polymerizable groups following polymerization of the arms.

The polymers capable of constituting such stellar polymers may be homopolymers or copolymers, including various species such as polystyrene, poly(meth)acrylates, polydienes, polyethers, polyesters and polysiloxanes, among others. For obtaining controlled stellar structures, it is necessary that the polymerization be controlled irrespective of which method is employed, so that anionic polymerization, living cationic polymerization or polycondensation is employed in most instances.

Apart from those polymers obtained by ionic polymerization or polycondensation mentioned above by way of example, vinyl polymers obtained by radical polymerization and having a stellar structure have virtually not been put to practical use. In particular, the method of achieving chain extension or constructing a stellar structure by joining polymerization growing termini has failed. Among vinyl polymers, (meth)acrylic polymers have some characteristics, such as high weathering resistance and transparency, that are not possessed by the above-mentioned polyether polymers, hydrocarbon polymers or polyester polymers. Thus, (meth)acrylic polymers having an alkenyl group or crosslinking silyl group on a side chain have been used in high weathering resistance paint compositions and so forth. However, it is not easy to control the polymerization for acrylic polymers owing to side reactions, and therefore it is very difficult to realize chain extension or construct a stellar structure.

Accordingly, the present invention has for its object to provide a method of producing a polymer comprising a radical polymerizable vinyl monomer and having extended chains or a stellar structure on polymerization as well as the polymer, further, to a composition in which said polymer is used.

SUMMARY OF THE INVENTION

The above-mentioned chain-extended polymer or stellar polymer can be produced by adding a coupling agent represented by a chemical formula selected from among the general formulas 1, 2 and 3 shown below at the end point of living polymerization, preferably atom transfer radical polymerization:

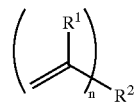

(In the above formula, $R^1$ is a group selected from among Ph, CN and $CO_2R^3$ ($R^3$ being a monovalent organic group), $R^2$ is an organic group having a valency of not less than two, and n is an integer of not less than 2);

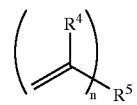

(In the above formula, $R^4$ is H, Me or a group selected from among organic groups containing 1 to 20 carbon atoms, $R^5$ is a benzene or naphthalene group having two or more substituted groups and n is an integer of 2 or more);

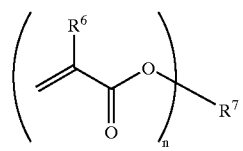

(In the above formula, $R^6$ is H, Me, CN or a group selected from among organic groups containing 1 to 20 carbon atoms, $R^7$ is an organic group having a valency of not less than two and n is an integer of not less than 2).

When, in this production method, a compound having a functional group other than the polymerization initiating functional group is used as an initiator, a chain-extended polymer or stellar polymer terminally having said functional group is obtained.

The present invention is also concerned with a polymer prepared by the method of the present invention. Said polymer, however, is not limited to the one obtained by the method of the present invention.

The polymer of the present invention has characteristics that the molecular weight distribution is narrow.

Further, a hydroxyl-terminated polymer according to the present invention, when combined with a compound having, in each molecule thereof, not less than two functional groups reactive with the hydroxyl group, gives a curable composition.

DETAILED DESCRIPTION OF THE INVENTION

The present invention is related to a method of producing a chain-extended polymer or a stellar polymer by polymerizing a vinyl monomer in the manner of living radical polymerization and adding a compound having two or more polymerizable carbon-carbon double bonds at the end point of polymerization.

The compound having two or more polymerizable carbon-carbon double bonds is not particularly restricted but is preferably a compound represented by a chemical formula selected from among the general formulas 1, 2 and 3 shown below:

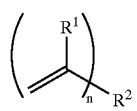
(1)

(In the above formula, $R^1$ is a group selected from among Ph, CN and $CO_2R^3$ ($R^3$ being a monovalent organic group), $R^2$ is an organic group having a valency of not less than two and n is an integer of not less than 2);

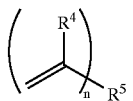
(2)

(In the above formula, $R^4$ is H, Me or a group selected from among organic groups containing 1 to 20 carbon atoms, $R^5$ is a benzene or naphthalene group having two or more substituted groups and n is an integer of 2 or more);

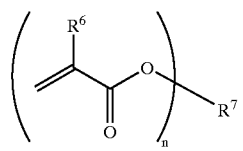
(3)

(In the above formula, $R^6$ is H, Me, CN or a group selected from among organic groups containing 1 to 20 carbon atoms, $R^7$ is an organic group having a valency of not less than two and n is an integer of not less than 2).)

These compounds will be described in detail hereinafter.

In the following, the technique of living polymerization is first described.

Living polymerization is a radical polymerization in which polymerization termini do not lose but retain their activity. While, in a narrow sense, the term "living polymerization" means a polymerization in which termini always maintain their activity, it generally includes quasi-living polymerization in which molecules terminally inactivated and molecules terminally activated are in equilibrium. In the present invention, the latter definition applies. In recent years, living radical polymerization has been studied actively by various groups. As an example, there may be mentioned the use of a cobalt-porphyllin complex (J. Am. Chem. Soc., 1994, 116, 7943) or of a radical scavenger such as a nitroxide compound (Macromolecules, 1994, 27, 7228), or the technique of atom transfer radical polymerization using an organic halide or the like as an initiator and a transition metal complex as a catalyst. In the atom transfer radical polymerization, polymerization is carried out using an organic halide, a halogenated sulfonyl compound or the like as an initiator and, as a catalyst, a metal complex containing a transition metal as a central atom. Specifically, reference may be made to the reports by Matyjaszewski et al.: J. Am. Chem. Soc., 1995, 111, 5614; Macromolecules, 1995, 28, 7901; Science, 1996, 272, 866, or the report by Sawamoto et al.: Macromoelcules, 1995, 28, 1721, International Laid-open Patent Applications WO 96/30421 and WO 97/18247, among others. In these methods, the polymerization proceeds in a living manner, generally at a very high rate of polymerization, to give a polymer with a narrow molecular weight distribution (namely an Mw/Mn value of about 1.1 to 1.5), in spite of its falling under the category of radical polymerization where termination reactions such as coupling of radicals with one another tend to occur. The molecular weight can be freely controlled by varying the charging ratio between the monomer and initiator.

In the present invention, which of those methods is employed is not particularly limited. From the viewpoint of ease of control, however, atom transfer radical polymerization is preferred.

First, the technique using a radical capping agent, such as a nitroxide compound, is described. In this polymerization, a nitroxy free radical (=N—O.), which is generally stable, is used as the radical capping agent. Such compounds include, as preferred examples, but are not limited to, cyclic hydroxy amine-derived nitroxy free radicals, such as 2,2,6,6-substituted 1-piperidinyloxy radicals and 2,2,5,5-substituted 1-pyrrolidinyloxy radicals. Suitable as the substituent are alkyl groups containing not more than four carbon atoms, such as methyl and ethyl. Specific examples of the nitroxy free radical compound include, but are not limited to, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-t-butylaminoxy radical. Other stable free radicals, such as galvinoxyl free radical, may also be used in lieu of the nitroxy free radical.

The above radical capping agent is used in combination with a radical generator. It is supposed that the reaction product from the radical capping agent and radical generator serves as a polymerization initiator and allows the polymerization of an addition-polymerizable monomer to proceed. The proportion of both agents in said combined use is not particularly restricted but it is suitable that the radical initiator be used in an amount of 0.1 to 10 moles per mole of the radical capping agent.

While various compounds can be used as the radical generator, a peroxide capable of generating radicals under polymerization temperature conditions is preferred. Said peroxide includes, but is not limited to, diacyl peroxides such as benzoyl peroxide and lauroyl peroxide, dialkyl peroxides such as dicumyl peroxide and di-t-butyl peroxide, peroxy carbonates such as diisopropyl peroxy dicarbonate and bis(4-tert-butylcyclohexyl) peroxy dicarbonate, alkyl peresters such as t-butyl peroxyoctoate and t-butyl peroxybenzoate, among others. In particular, benzoyl peroxide is preferred. A radical generating azo compound such as azobisisobutyronitrile may also be used in lieu of the peroxides.

As reported in Macromolecules, 1995, 28, 2993, as an alkoxyamine compound such as one represented by the formula shown below may be used in lieu of the combined use of a radical capping agent and a radical generator.

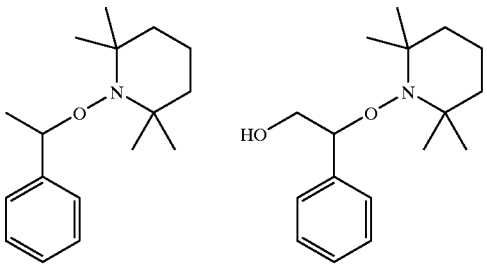

In cases where an alkoxyamine compound is used as the initiator and when said compound has a functional group such as a hydroxyl group, such as the one illustrated above, a functional group-terminated polymer is obtained. By applying this to the method of the present invention, it is possible to obtain a functional group-terminated stellar polymer.

The monomer(s), solvent, polymerization temperature and other conditions to be used in the polymerization using a radical capping agent such as the above-mentioned nitroxide compound are not restricted but may be the same as those used in the atom transfer radical polymerization to be mentioned in the following.

Atom transfer radical polymerization is now described, which is preferred as a mode of living radical polymerization in the present invention.

In this atom transfer radical polymerization, it is preferred that an organic halide, in particular an organic halide having a highly reactive carbon-halogen bond (e.g. an ester compound having a halogen atom at α position or a compound having a halogen atom at benzyl position) or a halogenated sulfonyl compound be used as the initiator. The transition metal complex to be used as the catalyst in said living radical polymerization is not particularly restricted but includes, as preferred examples, complexes of a transition metal of the group 7, 8, 9, 10 or 11 of the periodic table, more preferably complexes of copper having a valency of 0, monovalent copper, divalent ruthenium, divalent iron or divalent nickel. Among them, copper complexes are preferred. Specific examples of the monovalent copper are cuprous chloride, cuprous bromide, cuprous iodide, cuprous cyanide, cuprous oxide and cuprous perchlorate. Where a copper compound is used, a ligand, such as 2,2'-bipyridyl and derivatives thereof, 1,10-phenanthroline and derivatives thereof, tetramethylethylenediamine, pentamethyldiethylenetriamine, hexamethyltris(2-aminoethyl)amine and like polyamines, is added to increase the catalytic activity. The divalent ruthenium chloride-tristriphenylphosphine complex ($RuCl_2(PPh_3)_3$) is also suited for use as the catalyst. Where such a ruthenium compound is used as the catalyst, an aluminum alkoxide is added as an activator. Further, a divalent iron-bistriphenylphosphine complex ($FeCl_2(PPh_3)_2$), a divalent nickel-bistriphenylphosphine complex ($NiCl_2(PPh_3)_2$) and a divalent nickel-bistributylphosphine complex ($NiBr_2(PBu_3)_2$) are also suited as the catalyst.

The initiator to be used in atom transfer radical polymerization includes, but is not limited to, an organic halide (e.g. an ester compound having a halogen atom at α position or a compound having a halogen atom at benzyl position) or a halogenated sulfonyl compound. Specific examples are:

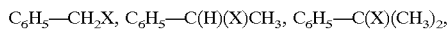

(In the above formulas, $C_6H_5$ represents a phenyl group, and X represents chlorine, bromine or iodine)

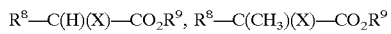

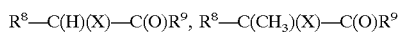

(In the above formulas, $R^8$ and $R^9$ are the same or different and each is a hydrogen atom or an alkyl group having 1 to 20 carbon atoms, an aryl group having 6 to 20 carbon atoms or an aralkyl group having 7 to 20 carbon atoms and X is chlorine, bromine or iodine);

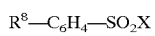

(In the above formula, $R^8$ is a hydrogen atom or an alkyl group having 1 to 20 carbon atoms, an aryl group having 6 to 20 carbon atoms or an aralkyl group having 7 to 20 carbon atoms and X is chlorine, bromine or iodine); and the like.

While, in atom transfer radical polymerization, an initiator having not less than two initiation sites is often used, the use of a monofunctional initiator is preferred in the present invention.

It is also possible to use an organic halide or halogenated sulfonyl compound having a functional group other than the functional group for initiating the polymerization. In such case, a vinyl polymer having said functional group at a main chain terminus is produced and, when this is subjected to coupling by the method of the present invention, a functional group-terminated polymer is obtained. As such functional group, there may be mentioned alkenyl groups, crosslinking silyl groups, hydroxyl group, epoxy group, amino group, amide group and so on.

The alkenyl-containing organic halide includes, but is not limited to, compounds having a structure represent by the general formula 4:

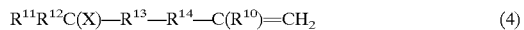

(In the above formula, $R^{10}$ is a hydrogen atom or a methyl group, $R^{11}$ and $R^{12}$ each is a hydrogen atom or a $C_1$ to $C_{20}$ monovalent alkyl group or an aryl or aralkyl group or those are bound together at their respective other termini, $R^{13}$ is —C(O)O— (ester group), —C(O)— (keto group) or an o-, m- or p-phenylene group, $R^{14}$ is a direct bond or a $C_1$ to $C_{20}$ divalent organic group which may optionally contain not less than one ether bond, and X is chlorine, bromine or iodine).

As specific examples of the substituents $R^{11}$ and $R^{12}$, there may be mentioned hydrogen, methyl, ethyl, n-propyl, isopropyl, butyl, pentyl, hexyl and the like.

$R^{11}$ and $R^{12}$ may be bound together at their respective other termini to form a cyclic skeletal structure.

The alkenyl-containing organic halide includes compounds represented by the general formula 4:

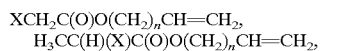

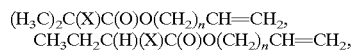

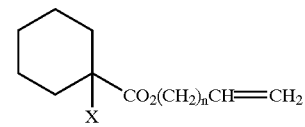

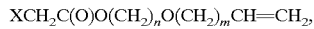

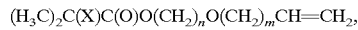

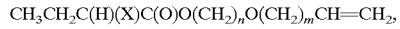

(In each formula mentioned above, X is chlorine, bromine or iodine, and n represents an integer of 0 to 20.)

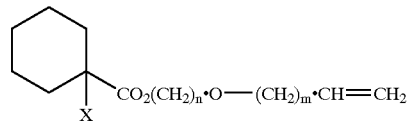

(In each formula mentioned above, X is chlorine, bromine or iodine, n represents an integer of 1 to 20, and m represents an integer of 0 to 20.)

o,m,p-XCH$_2$—C$_6$H$_4$—(CH$_2$)$_n$—CH=CH$_2$, o,m,p-CH$_3$C(H)(X)—C$_6$H$_4$—(CH$_2$)$_n$—CH=CH$_2$, o,m,p-CH$_3$CH$_2$C(H)(X)—C$_6$H$_4$—(CH$_2$)$_n$—CH=CH$_2$, (In each formula mentioned above, X is chlorine, bromine or iodine, and n represents an integer of 0 to 20.)

o,m,p-XCH$_2$—C$_6$H$_4$—(CH$_2$)$_n$—O—(CH$_2$)$_m$—CH=CH$_2$, o,m,p-CH$_3$C(H)(X)—C$_6$H$_4$—(CH$_2$)$_n$—O—(CH$_2$)$_m$—CH=CH$_2$, o,m,p-CH$_3$CH$_2$C(H)(X)—C$_6$H$_4$—(CH$_2$)$_n$—O—(CH$_2$)$_m$CH=CH$_2$, (In each formula mentioned above, X is chlorine, bromine or iodine, n represents an integer of 1 to 20, and m represents an integer of 0 to 20.)

o,m,p-XCH$_2$—C$_6$H$_4$—O—(CH$_2$)$_n$—CH=CH$_2$, o,m,p-CH$_3$C(H)(X)—C$_6$H$_4$—O—(CH$_2$)$_n$—CH=CH$_2$, o,m,p-CH$_3$CH$_2$C(H)(X)—C$_6$H$_4$—O—(CH$_2$)$_n$—CH=CH$_2$, (In each formula mentioned above, X is chlorine, bromine or iodine, and n represents an integer of 0 to 20.)

o,m,p-XCH$_2$—C$_6$H$_4$—O—(CH$_2$)$_n$—O—(CH$_2$)$_m$—CH=CH$_2$, o,m,p-CH$_3$C(H)(X)—C$_6$H$_4$—O—(CH$_2$)$_n$—O—(CH$_2$)$_m$—CH=CH$_2$, o,m,p-CH$_3$CH$_2$C(H)(X)—C$_6$H$_4$—O—(CH$_2$)$_n$—O—(CH$_2$)$_m$—CH=CH$_2$, (In each formula mentioned above, X is chlorine, bromine or iodine, n represents an integer of 1 to 20, and m represents an integer of 0 to 20.)

The alkenyl-containing organic halide further includes compounds represented by the general formula 5:

$$H_2C=C(R^{10})—R^{14}—C(R^{11})(X)—R^{15}—R^{12} \quad (5)$$

(In the above formula, $R^{10}$, $R^{11}$, $R^{12}$, $R^{14}$ and X are as defined above and $R^{15}$ represents a direct bond, —C(O)O— (ester group), —C(O)— (keto group) or an o-, m- or p-phenylene group).

$R^{14}$ represents a direct bond or a divalent organic group having 1 to 20 carbon atoms (which may contain one or more ether bonds). When it is a direct bond, a vinyl group is bound to the halogen-bound carbon atom, forming an allyl halide compound. In this case, the carbon-halogen bond is activated by the adjacent vinyl group and, therefore, it is not always necessary that $R^{15}$ be a C(O)O group or a phenylene group but may be a direct bond. When $R^{14}$ is not a direct bond, $R^{15}$ is preferably a C(O)O group, a C(O) group or a phenylene group, so that the carbon-halogen bond may be activated.

As specific examples of the compounds of the formula (5), there can be mentioned:

CH$_2$=CHCH$_2$X, CH$_2$=C(CH$_3$)CH$_2$X,
CH$_2$=CHC=CHC(H)(X)CH$_3$,

CH$_2$=C(CH$_3$)C(H)(X)CH$_3$, CH$_2$=CHC(X)(CH$_3$)$_2$,
CH$_2$=CHC(H)(X)C$_2$H$_5$,

CH$_2$(H)(X)CH(CH$_3$)$_2$, CH$_2$=CHC(H)(X)C$_6$H$_5$,
CH$_2$=CHC(H)(X)CH$_2$C$_6$H$_5$,

CH$_2$=CHCH$_2$C(H)(X)—CO$_2$R, CH$_2$=CH(CH$_2$)$_2$C(H)(X)—CO$_2$R,

CH$_2$=CH(CH$_2$)$_3$C(H)(X)—CO$_2$R, CH$_2$=CH(CH$_2$)$_8$C(H)(X)—CO$_2$R,

CH$_2$=CHCH$_2$C(H)(X)—C$_6$H$_5$, CH$_2$=CH(CH$_2$)$_2$C(H)(X)—C$_6$H$_5$,

CH$_2$=CH(CH$_2$)$_3$C(H)(X)—C$_6$H$_5$, (In each formula mentioned above, X is chlorine, bromine or iodine, R represents an alkyl group having 1 to 20 carbon atoms, an aryl group or an aralkyl group.).

As specific examples of alkenyl group-containing halogenated sulfonyl compound, there can be mentioned, among other:

o-,m-,p-CH$_2$=CH—(CH$_2$)$_n$—C$_6$H$_4$—SO$_2$X, o-,m-,p-CH$_2$=CH—(CH$_2$)$_n$—O—C$_6$CH$_4$—SO$_2$X, (In each formula mentioned above, X is chlorine, bromine or iodine, and n represents an integer of 0 to 20 carbon atoms.)

The crosslinking silyl-containing organic halide mentioned above is not particularly restricted but includes, among others, compounds having a structure represented by the general formula 6:

$$R^{11}R^{12}C(X)—R^{13}—R^{14}—C(H)(R^{10})CH_2—[Si(R^{16})_{2-b}(Y)_bO]m-Si(R^{17})_{3-a}(Y)_a \quad (6)$$

(In the above formula, $R^{10}$, $R^{11}$, $R^{12}$, $R^{13}$, $R^{14}$ and X are as defined above and $R^{16}$ and $R^{17}$ each is an alkyl group having 1 to 20 carbon atoms, an aryl group or an aralkyl group or a triorganosiloxy group represented by (R')$_3$SiO— (in which R' is a monovalent hydrocarbon group having 1 to 20 carbon atoms and the three R' groups may be the same or different) and, when there are not less than two $R^{16}$ or $R^{17}$ groups, they may be the same or different, Y represents a hydroxyl group or a hydrolyzable group and, when there are not less than two Y groups, they may be the same or different, a represents 0, 1, 2 or 3, b represents 0, 1 or 2 and m is an integer of 0 to 19, with the condition that the sum a+mb is not less than 1, namely a+mb≧1.

As specific examples of the compounds of the general formula (6), there can be mentioned:

XCH$_2$C(O)O(CH$_2$)$_n$Si(OCH$_3$)$_3$,
CH$_3$C(H)(X)C(O)O(CH$_2$)$_n$Si(OCH$_3$)$_3$, (CH$_3$)$_2$C(X)C(O)O(CH$_2$)$_n$Si(OCH$_3$)$_3$,
XCH$_2$C(O)O(CH$_2$)$_n$Si(CH$_3$)(OCH$_3$)$_2$,

CH$_3$C(H)(X)C(O)O(CH$_2$)$_n$Si(CH$_3$)(OCH$_3$)$_2$, (CH$_3$)$_2$C(X)C(O)O(CH$_2$)$_n$Si(CH$_3$)(OCH$_3$)$_2$, (In each formula mentioned above, X is chlorine, bromine or iodine, and n represents an integer of 0 to 20 carbon atoms.)

XCH$_2$C(O)O(CH$_2$)$_n$O(CH$_2$)$_m$Si(OCH$_3$)$_3$,

H$_3$CC(H)(X)C(O)O(CH$_2$)$_n$O(CH$_2$)$_m$Si(OCH$_3$)$_3$, (H$_3$C)$_2$C(X)C(O)O(CH$_2$)$_n$O(CH$_2$)$_m$Si(OCH$_3$)$_3$,

CH$_3$CH$_2$C(H)(X)C(O)O(CH$_2$)$_n$O(CH$_2$)$_m$Si(OCH$_3$)$_3$,

XCH$_2$C(O)O(CH$_2$)$_n$O(CH$_2$)$_m$Si(CH$_3$)(OCH$_3$)$_2$,

H$_3$CC(H)(X)C(O)O(CH$_2$)$_n$O(CH$_2$)$_m$—Si(CH$_3$)(OCH$_3$)$_2$, (H$_3$C)$_2$C(X)C(O)O(CH$_2$)$_n$O(CH$_2$)$_m$—Si(CH$_3$)(OCH$_3$)$_2$,

CH$_3$CH$_2$C(H)(X)C(O)O(CH$_2$)$_n$O(CH$_2$)$_m$—Si(CH$_3$)(OCH$_3$)$_2$, (In each formula mentioned above, X is chlorine, bromine or iodine, n represents an integer of 1 to 20 carbon atoms, and m represents an integer of 0 to 20 carbon atoms.)

o,m,p-XCH$_2$—C$_6$H$_4$—(CH$_2$)$_2$Si(OCH$_3$)$_3$, o,m,p-CH$_3$C(H)(X)—C$_6$H$_4$—(CH$_2$)$_2$Si(OCH$_3$)$_3$, o,m,p-CH$_3$CH$_2$C(H)(X)—C$_6$H$_4$—(CH$_2$)$_2$Si(OCH$_3$)$_3$, o,m,p-XCH$_2$—C$_6$H$_4$—(CH$_2$)$_3$Si(OCH$_3$)$_3$, o,m,p-CH$_3$C(H)(X)—C$_6$H$_4$—(CH$_2$)$_3$Si(OCH$_3$)$_3$, o,m,p-CH$_3$CH$_2$C(H)(X)—C$_6$H$_4$—(CH$_2$)$_3$Si(OCH$_3$)$_3$, o,m,p-XCH$_2$—C$_6$H$_4$—(CH$_2$)$_2$—O—(CH$_2$)$_3$Si(OCH$_3$)$_3$, o,m,p-CH$_3$C(H)(X)—C$_6$H$_4$—(CH$_2$)$_2$—O—(CH$_2$)$_3$Si(OCH$_3$)$_3$, o,m,p-CH$_3$CH$_2$C(H)(X)—C$_6$H$_4$—(CH$_2$)$_2$—O—(CH$_2$)$_3$Si(OCH$_3$)$_3$, o,m,p-XCH$_2$—C$_6$H$_4$—O—(CH$_2$)$_3$Si(OCH$_3$)$_3$, o,m,p-CH$_3$C(H)(X)—C$_6$H$_4$—O—(CH$_2$)$_3$Si(OCH$_3$)$_3$, o,m,p-CH$_3$CH$_2$C(H)(X)—C$_6$H$_4$—O—(CH$_2$)$_3$—Si(OCH$_3$)$_3$, o,m,p-XCH$_2$—C$_6$H$_4$—O—(CH$_2$)$_2$—O—(CH$_2$)$_3$—Si(OCH$_3$)$_3$, o,m,p-CH$_3$C(H)(X)—C$_6$H$_4$—O—(CH$_2$)$_2$—O—(CH$_2$)$_3$Si(OCH$_3$)$_3$, o,m,p-CH$_3$CH$_2$C(H)(X)—C$_6$H$_4$—O—(CH$_2$)$_2$—O—(CH$_2$)$_3$Si(OCH$_3$)$_3$, (In each formula mentioned above, X is chlorine, bromine or iodine.)

The above crosslinking silyl-containing organic halide further includes compounds having a structure represented by the general formula 7:

$(R^{17})_{3-a}(Y)_a Si$—$[OSi(R^{16})_{2-b}(Y)_b]_m$—$CH_2$—$C(H)(R^{10})$—$R^{14}$—$C(R^{11})(X)$—$R^{15}$—$R^{12}$ (7)

(In the above formula, $R^{10}$, $R^{11}$, $R^{12}$, $R^{14}$, $R^{15}$, $R^{16}$, $R^{17}$, a, b, m, X and Y are as defined above).

As specific examples of such compounds, there can be mentioned:

(CH$_3$O)$_3$SiCH$_2$CH$_2$C(H)(X)C$_6$H$_5$,
(CH$_3$O)$_2$(CH$_3$)SiCH$_2$CH$_2$C(H)(X)C$_6$H$_5$, (CH$_3$O)$_3$Si(CH$_2$)$_2$C(H)(X)—CO$_2$R,
(CH$_3$O)$_2$(CH$_3$)Si(CH$_2$)$_2$C(H)(X)—CO$_2$R, (CH$_3$O)$_3$Si(CH$_2$)$_3$C(H)(X)—CO$_2$R,
(CH$_3$O)$_2$(CH$_3$)Si(CH$_2$)$_3$C(H)(X)—CO$_2$R, (CH$_3$O)$_3$Si(CH$_2$)$_4$C(H)(X)—CO$_2$R,
(CH$_3$O)$_2$(CH$_3$)Si(CH$_2$)$_4$C(H)(X)—CO$_2$R, (CH$_3$O)$_3$Si(CH$_2$)$_9$C(H)(X)—CO$_2$R,
(CH$_3$O)$_2$(CH$_3$)Si(CH$_2$)$_9$C(H)(X)—CO$_2$R, (CH$_3$O)$_3$Si(CH$_2$)$_3$C(H)(X)—C$_6$H$_5$,
(CH$_3$O)$_2$(CH$_3$)Si(CH$_2$)$_3$C(H)(X)—C$_6$H$_5$, (CH$_3$O)$_3$Si(CH$_2$)$_4$C(H)(X)—C$_6$H$_5$,
(CH$_3$O)$_2$(CH$_3$)Si(CH$_2$)$_4$C(H)(X)—C$_6$H$_5$, (In each formula mentioned above, X is chlorine, bromine or iodine, R represents an alkenyl group having 1 to 20 carbon atoms, an aryl group and an aralkyl group.)

The above-mentioned hydroxyl-containing organic halide or halogenated sulfonyl compound is not particularly restricted but includes, among others, compounds in the following:

HO—(CH$_2$)$_n$—OC(O)C(H)(R)(X)

(In the above formula, X is a chlorine, bromine or iodine atom, R is a hydrogen atom or an alkyl group having 1 to 20 carbon atoms, an aryl group or an aralkyl group and n is an integer of 1 to 20).

The above-mentioned amino-containing organic halide or halogenated sulfonyl compound is not particularly restricted but includes, among others, compounds in the following:

H$_2$N—(CH$_2$)$_n$—OC(O)C(H)(R)(X)

(In each formula mentioned above, X is a chlorine, bromine or iodine atom, R is a hydrogen atom or an alkyl group having 1 to 20 carbon atoms, an aryl group or an aralkyl group and n is an integer of 1 to 20).

The above-mentioned epoxy-containing organic halide or halogenated sulfonyl compound is not particularly restricted but includes, among others, compounds in the following:

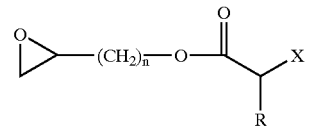

(In the formula, X is a chlorine, bromine or iodine atom, R is a hydrogen atom or as alkyl group having 1 to 20 carbon atoms, an aryl group or an aralkyl group and n is an integer of 1 to 20.).

Vinyl monomers to be used in the present invention are not restricted but include any kinds thereof. As an example, there can be mentioned, any of (meth)acrylic acid type monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, etc.; styrene type monomers such as styrene, vinyltoluene, α-methylstyrene, chlorostyrene, styrenesulfonic acid and salts thereof, etc.; fluorine-containing vinyl monomers such as perfluoroethylene, perfluoropropylene, vinylidene fluoride, etc.; silicon-containing vinyl monomers such as vinyltrimethoxysilane, vinyltriethoxysilane, etc.; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide, etc.; nitrile-containing vinyl monomers such as acrylonitrile, methacrylonitrile, etc.; amide-containing vinyl monomers such as acrylamide, methacrylamide, etc.; vinyl esters such as vinyl acetate, vinyl propionate, vinyl pivalate, vinyl benzoate, vinyl cinnamate, etc.; alkenes such as ethylene, propylene, etc.; conjugated dienes such as butadiene, isoprene, etc.; vinyl chloride, vinylidene chloride, allyl chloride, and allyl alcohol. Those monomers may be used each independently or optionally a plurality of them may be copolymerized.

In the case of copolymerization, either random copolymerization or block copolymerization may be employed. Block copolymerization is preferred, however. From the viewpoint of physical properties of products, among others, (meth)acrylic monomers, acrylonitrile monomers, aromatic vinyl monomers, fluorine-containing vinyl monomers and silicon-containing vinyl monomers are preferred, among others. More preferred are acrylate ester monomers and methacrylate ester monomers. Butyl acrylate is most preferred. In the present invention, these preferred monomers may be copolymerized with some other monomer(s) and, on that occasion, the content of said preferred monomers is preferably 40% by weight. In the above manner of expression, (meth)acrylic acid, for instance, means acrylic acid and/or methacrylic acid.

The living radical polymerization of the present invention can be carried out in the absence or presence of a solvent. Said solvent includes, among others, hydrocarbon solvents such as benzene and toluene; ether solvents such as diethyl ether, tetrahydrofuran, diphenyl ether, anisole and dimethoxybenzene; halogenated hydrocarbon solvents such as methylene chloride, chloroform and chlorobenzene; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; and carbonate solvents such as ethylene carbonate and propylene carbonate. These may be used singly or not less than two of them may be used in combination. It is also possible to carry out the polymerization in an emulsion system or even in a system in which the medium is supercritical liquid $CO_2$.

The polymerization of the present invention can be carried out within the range of 0° C. to 200° C., more preferably room temperature to 150° C., although the range of said temperature is not limited thereto.

At the end point of such living radical polymerization, a compound having two or more polymerizable carbon-carbon double bonds is added, whereupon the coupling reaction occurs to form a chain-extended polymer or a polymer having a stellar structure. In that case, a chain-extended polymer having no stellar structure or a polymer having a stellar structure may be formed according to the addition amount of the compound having not less than two polymerizable carbon-carbon double bond. These two cases fall under the scope of the present invention. The end point of polymerization is the time point at which not less than 80%, preferably not less than 90%, more preferably not less than 95%, most preferably not less than 99%, of the monomer(s) has(have) reacted.

The compound having two or more polymerizable carbon-carbon double bonds is selected from among, but is not limited to, compounds represented by the general formula 1, 2 or 3:

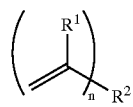

(In the above formula, $R^1$ is a group selected from among Ph, CN and $CO_2R^3$ ($R^3$ being a monovalent organic group), $R^2$ is an organic group having a valency of not less than two and n is an integer of not less than 2);

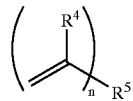

(In the above formula, $R^4$ is H, Me or a group selected from among organic groups containing 1 to 20 carbon atoms, $R^5$ is a benzene or naphthalene group having two or more substituted groups and n is an integer of 2 or more);

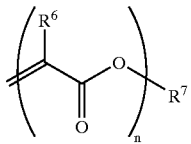

(In the above formula, $R^6$ is H, Me, CN or a group selected from among organic groups containing 1 to 20 carbon atoms, $R^7$ is an organic group having a valency of not less than two and n is an integer of not less than 2).

In each formula mentioned above, the monovalent organic group represented by $R^3$, $R^4$ and/or $R^6$ is not particularly restricted but includes the following:

—$(CH_2)_n$—$CH_3$, —$CH(CH_3)$—$(CH_2)_n$—$CH_3$, —$CH(CH_2CH_3)$—$(CH_2)_n$—$CH_3$

—$CH(CH_2CH_3)_2$, —$C(CH_3)_2$—$(CH_2)_n$—$CH_3$, —$C(CH_3)(CH_2CH_3)$—$(CH_2)_n$—$CH_3$,

—$C_6H_5$, —$C_6H_5(CH_3)$, —$C_6H_5(CH_3)_2$, —$(CH_2)_n$—$C_6H_5$, —$(CH_2)_n$—$C_6H_5(CH_3)$,

—$(CH_2)_n$—$C_6H_5(CH_3)_2$ (n being an integer of not less than 0 and the total number of carbon atoms in each group being not more than 20).

In the above formulas, $R^2$ and $R^7$ each is an at least divalent organic group and includes, but is not limited to, the following:

—$(CH_2)_n$—(n represents an integer of 1 to 20.);—$CH(CH_3)$—,

—$CH(CH_2CH_3)$—,—$C(CH_3)_2$—,—$C(CH_3)(CH_2CH_3)$—,—$C(CH_2CH_3)_2$—,

—$CH_2CH(CH_3)$—;—$(CH_2)_n$—O—$CH_2$—(n represents an integer of 1 to 19.);—$CH(CH_3)$—O—$CH_2$—,—$CH(CH_2CH_3)$—O—$CH_2$—, —$C(CH_3)_2$—O—$CH_2$—,

—$C(CH_3)(CH_2CH_3)$—O—$CH_2$—,—$C(CH_2CH_3)_2$—O—$CH_2$—,—$(CH_2)_2$—OC(O)—;

—$(CH_2)_n$—OC(O)—$(CH_2)_m$—(m and n are the same or different, and they represents an integer of 0 to 19, provided they meets the relation of $0 \leq m+n \leq 19$); —$(CH_2)_n$—C(O)O—$(CH_2)_m$—(m and n are the same or different, and they represents an integer of 0 to 19, provided they meets the relation of $0 \leq m+n \leq 19$);

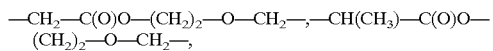

$R^2$ and $R^7$ each may contain a benzene ring. As specific examples in this case, there can be mentioned;

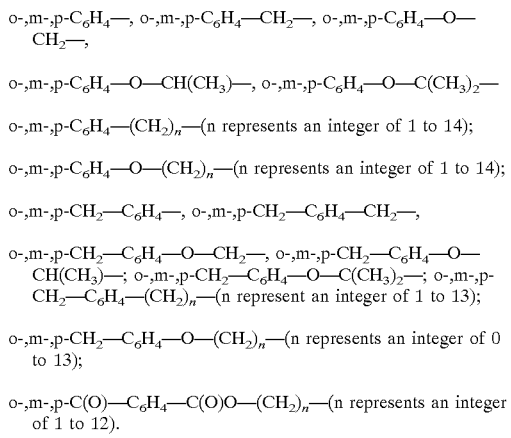

When specifically mentioned, the above compound includes, but is not particularly limited to, polyvinyl aromatic compounds such as 1,3-divinylbenzene, 1,4-divinylbenzene, 1,2-diisopropenylbenzene, 1,3-diisopropenylbenzene, 1,4-diisopropenylbenzene, 1,3-divinylnaphthalene, 1,8-divinylnaphthalene, 2,4-divinylbiphenyl, 1,2-divinyl-3,4-dimethylbenzene, 1,3-divinyl-4,5,8-tributylnaphthalene and 2,2'-divinyl-4-ethyl-4'-propylbiphenyl, and poly(meth)acrylates such as ethylene glycol dimethacrylate and ethylene glycol diacrylate. Among these, polyvinyl aromatic compounds are preferred and divinylbenzenes are more preferred.

The addition amount of the compound having not less than two polymerizable alkenyl groups is not particularly restricted but is preferably such that the number of olefins is not less than equal to the number of growing termini of the arm-forming polymer. If it is less, uncoupled polymer may remain in large amounts. More preferably, the addition amount of the compound having not less than two polymerizable alkenyl groups, though not particularly restricted, is such that the number of the olefins be not more than 20 times, more preferably not more than 10 times, most preferably not more than 5 times, the number of the growing termini of the arm-forming polymers.

The reaction conditions after addition of the coupling agent are not particularly restricted but may be the same as the polymerization conditions for the arm-forming polymer.

Further, the present invention is related to the polymer prepared by the method of the present invention. However, said polymer is not limited to the one produced by the method of the present invention.

The polymer of the present invention has characteristics of, but is not limited to, a narrow molecular weight distribution, namely narrow ratio (Mw/Mn) of the weight average molecular weight (Mw) to the number average molecular weight (Mn) as measured by gel permeation chromatography (GPC). The molecular weight distribution value is preferably not more than 3, more preferably not more than 2, still more preferably not more than 1.8, especially not more than 1.6, particularly not more than 1.4, most preferably not more than 1.3. In the present invention of the GPC measurement, it is not particularly restricted but is generally carried out using a polystyrene gel column with chloroform as the mobile phase. The number average molecular weight and the like can be determined in terms of polystyrene equivalent. It is known that the molecular weight of a stellar polymer determined by GPC measurement generally shows a lower value than the true molecular weight.

The hydroxyl-terminated polymer obtained in accordance with the present invention, when combined with a compound having, in each molecule, not less than two functional groups reactive with the hydroxyl group, gives a curable composition.

The composition containing the hydroxyl-terminated polymer (hereinafter referred to as polymer (I)) of the present invention may contain, in addition to the polymer (I), a per se known hydroxyl-containing low-molecular compound or a per se known hydroxyl-containing polymer (e.g. acrylic polyol, polyether polyol, polyester polyol, polycarbonate polyol, polybutadiene polyol, polyolefin polyol).

The compound (a) having not less than two functional groups reactive with the hydroxyl group includes, but is not particularly limited to, a compound (b) having, in each molecule, not less than two isocyanato groups, an aminoplast resin (c) such as hydroxymethylated melamine or an alkyl ether thereof or a low condensate thereof, and a compound (d) having, in each molecule, not less than two carboxyl groups, such as a polyfunctional carboxylic acid or a halide thereof, among others.

The compound (b) having, in each molecule, not less than two isocyanato groups is the so-called polyfunctional isocyanate. This polyfunctional isocyanate (b) may be any of those known in the art and thus includes, among others, toluylene diisocayante, 4,4'-diphenylmethane diisocyanate, hexamethyl diisocyanate, xylylene diisocyanate, meta-xylylene diisocyanate, 1,5-naphthalene diisocyanate, hydrogenated diphenylmethane diisocyanate, hydrogenated toluylene diisocyanate, hydrogenated xylylene diisocyanate, isophorone diisocyanate and like isocyanate compounds; biuret form polyisocyanate compounds such as Sumidur N (product of Sumitomo Bayer Urethane); isocyanurate ring-containing polyisocyanate compounds such as DesmodurIL and HL (products of Bayer A. G.) and Coronate EH (product of Nippon Polyurethane Industry); and adduct form polyisocyante compounds such as Sumidur L (product of Sumitomo Bayer Urethane) and Coronate HL (product of Nippon Polyurethane). These may be used singly or two or more of them may be used combinedly. It is also possible to use a blocked isocyanate.

To make better use of the excellent weathering resistance of the composition comprising the polymer (I) and a polyfunctional isocyanate compound (b), it is preferred that an aromatic ring-free isocyanate compound, such as hexamethylene diisocyanate, hydrogenated diphenylmethane diisocyanate or Sumidur N (product of Sumitomo Bayer Urethane), be used as the polyfunctional isocyanate compound (b).

The compounding ratio between the polymer (I) and the polyfunctional isocyanate compound(b) having, in each molecule, not less than two isocyanato groups is not particularly restricted but is preferably such that the mole ratio of the isocyanato groups which this compound (b) has and the hydroxyl groups which the polymer (I) has (namely the NCO/OH mole ratio) be 0.5 to 1.5, more preferably 0.8 to 1.2. In cases where said composition is to be used in a field where excellent weathering resistance is required, the NCO/OH mole ratio may amount to about 3.0 where appropriate.

For promoting the urethane-forming reaction between the polymer (I) and polyfunctional isocyanate compound (b), which are the components of the polymer (I)-containing composition, a per se known catalyst such as an organotin compound or a tertiary amine may optionally be added according to need.

The aminoplast resin (c) to be used in the polymer (I)-containing composition includes, but is not particularly limited to, reaction products (hydromethylated compounds) from a triazine ring-containing compound represented by the general formula shown below and formaldehyde, low condensation products from said triazine ring-containing compound and formaldehyde, derivatives of these, and urea resins, among others.

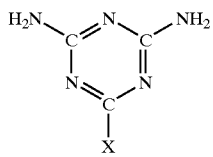

(In the above formula, X represents an amino, phenyl, cyclohexyl, methyl or vinyl group).

The triazine ring-containing compound represented by the above general formula includes, but is not limited to, melamine, benzoguanamine, cyclohexanecarboguanamine, methylguanamine and vinylguanamine, among others. These may be used singly or two or more of them may be used combinedly.

The above-mentioned reaction products from a triazine ring-containing compound and formaldehyde, or derivatives thereof include, but are not particularly limited to, hexamethoxymethylmelamine and tetramethoxymethylbenzoguanamine, among others. The above-mentioned low condensation products from said triazine ring-containing compound and formaldehyde or derivatives thereof include, but are not limited to, low condensation products from several molecules of said triazine ring-containing compound as bound together via the bond —NH—CH$_2$—O—CH$_2$—NH— and/or —NH—CH$_2$—NH— and an alkyl etherified formaldehyde resin (Cymel; product of Mitusi Cyanamid), among others. These aminoplast resins (c) may be used singly or two or more of them may be used combinedly.

In synthesizing the aminoplast resins (c), the ratio between the above-mentioned trizine ring-containing compound and formaldehyde may vary according to the intended use. It is preferred, however, that the mole ratio between said triazine ring-containing compound and formaldehyde (triazine ring-containing compound/formaldehyde) be within the range of 1 to 6.

In the polymer (I)-containing composition containing, as essential components, the polymer (I) and an aminoplast resin (c) as the compound (a), the ratio (weight ratio) between the polymer (I) and aminoplast resin (c) is preferably 95:5 to 50:50, more preferably 80:20 to 60:40.

A per se known catalyst, such as paratoluenesulfonic acid or benzenesulfonic acid, may optionally be added to the polymer (I)-containing composition comprising, as essential components, the polymer (I) and aminoplast resin (c) to promote the reaction according to need.

The compound (d) containing, in each molecule, not less than two carboxyl groups, which is to be used in the polymer (I)-containing composition includes, but is not limited to, oxalic acid, malonic acid, succinic acid, glutaric acid, adipic acid, phthalic acid, phthalic anhydride, terephthalic acid, trimellitic acid, trimellitic anhydride, pyromellitic acid, pyromellitic anhydride, maleic acid, maleic anhydride, fumaric acid, itaconic acid, diphenic acid, naphthalenedi- carboxylic acid and like polyfunctional carboxylic acids or anhydrides thereof, halides thereof, and polymers having a plurality of carboxyl groups, among others. These compounds (d) may be used singly or two or more of them may be used combinedly. The mole ratio between the compound (d) and the hydroxyl groups in polymer (I) (compound (d)/hydroxyl in polymer (I)) is preferably 1 to 3, more preferably 1 to 2.

The polymer produced in accordance with the present invention is used in lubricant compositions, among others, although the use of said polymer is not limited thereto. In cases where said polymer is a functional group-terminated one, said polymer can be converted to an elastomer by subjecting it to crosslinking reaction utilizing the hydroxyl, crosslinking silyl, alkenyl or like functional groups as they are or after conversion thereof to a different functional group such as a crosslinking silyl group. As specific uses, there may be mentioned, among others, sealing agents, adhesives, self-adhesives, elastic adhesives, paints, powder coatings, foamed products, potting agents in electric and electronic industries, films, gaskets, various molding materials and artificial marble.

BEST MODES FOR CARRYING OUT THE INVENTION

The following examples illustrate several typical embodiments of this invention. They are, however, by no means limitative of the scope of the present invention.

Example 1

A 30-mL glass reaction vessel was charged with butyl acrylate (10.0 mL. 8.94 g, 69.75 mmol), cuprous bromide (250 mg, 1.74 mmol), pentamethyldiethylenetriamine (0.364 mL, 302 mg, 1.74 mmol) and toluene (1 mL) and, after cooling, the charge was degassed under reduced pressure, followed by substitution with nitrogen gas. After thorough stirring, methyl 2-bromopropionate (0.195 mL, 291 mg, 1.74 mmol) was added, and the mixture was heated at 70° C. with stirring. Thirty minutes later, divinylbenzene (3.49 mmol) was added and heating at 70° C. was continued with stirring. The reaction mixture was diluted with ethyl acetate, the resulting insoluble solid matter was filtered off, and the filtrate was washed with two portions of dilute hydrochloric acid and one portion of brine. The organic layer was dried over Na$_2$SO$_4$ and the volatile matter was distilled off under reduced pressure to give stellar poly(butyl acrylate). At the time of addition of divinylbenzene, the degree of conversion of butyl acrylate was not less than 99% and the polymer formed had a number average molecular weight of 4,900 (as polystyrene equivalent) as determined by GPC measurement, with a molecular weight distribution of 1.26. The main product finally obtained had a number average molecular weight of 52,100, with a molecular weight distribution of 1.24.

Example 2

A 30-mL glass reaction vessel was charged with butyl acrylate (10.0 mL. 8.94 g, 69.75 mmol), cuprous bromide (250 mg, 1.74 mmol), pentamethyldiethylenetriamine (0.364 mL, 302 mg, 1.74 mmol) and toluene (1 mL) and, after cooling, the charge was degassed under reduced pressure, followed by substitution with nitrogen gas. After thorough stirring, methyl 2-bromopropionate (0.195 mL, 291 mg, 1.74 mmol) was added, and the mixture was heated at 70° C. with stirring. Thirty minutes later, divinylbenzene (0.87 mmol) was added and heating at 70° C. was continued with stirring. The reaction mixture was diluted with ethyl acetate, the resulting insoluble solid matter was filtered off, and the filtrate was washed with two portions of dilute hydrochloric acid and one portion of brine. The organic layer was dried over $Na_2SO_4$ and the volatile matter was distilled off under reduced pressure to give stellar poly(butyl acrylate). At the time of addition of divinylbenzene, the degree of conversion of butyl acrylate was not less than 99% and the polymer formed had a number average molecular weight of 4,800 (as polystyrene equivalent) as determined by GPC measurement, with a molecular weight distribution of 1.22. The main product finally obtained had a number average molecular weight of 33,300, with a molecular weight distribution of 1.19.

Example 3

A 30-mL glass reaction vessel was charged with butyl acrylate (10.0 mL. 8.94 g, 69.75 mmol), cuprous bromide (250 mg, 1.74 mmol), pentamethyldiethylenetriamine (0.364 mL, 302 mg, 1.74 mmol) and toluene (1 mL) and, after cooling, the charge was degassed under reduced pressure, followed by substitution with nitrogen gas. After thorough stirring, 2-hydroxyethyl bromopropionate (344 mg, 1.74 mmol) was added, and the mixture was heated at 70° C. with stirring. Thirty-five minutes later, a solution of divinylbenzene (0.87 mmol) in n-hexane was added and heating at 70° C. was continued with stirring. Eight hours later, the reaction was stopped. The reaction mixture was diluted with ethyl acetate, the dilution was passed through an activated alumina column to thereby remove the catalyst, to give a hydroxyl-terminated stellar poly(butyl acrylate) (yield 5.20 g). The degree of conversion of butyl acrylate was not less than 99% and the main product stellar polymer finally obtained had a number average molecular weight of 36,000 (as polystyrene equivalent) as determined by GPC measurement, with a molecular weight distribution of 1.58.

Example 4

The hydroxyl-terminated stellar poly(butyl acrylate) obtained in Example 3 (0.5 g) was thoroughly mixed with the trifunctional isocyanate compound (Ipposha Yushi's product B-45) illustrated below (0.135 g). The mixing ratio was such that the mole ratio between the hydroxyl group of the (meth)acrylic polymer and the isocyanato group of the isocyanate compound was 1/1.

The above-mentioned mixture was deaerated under reduced pressure, then poured into a mold and cured by heating at 80° C. for 15 hours. A rubber-like cured product was obtained. The cured product obtained was immersed in toluene for 24 hours and the gel fraction was calculated based on the change in weight after immersion as compared with the weight before immersion. The result was 96% and it was confirmed that the hydroxyl group had been terminally introduced.

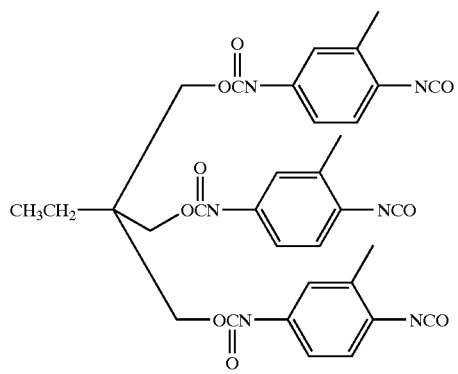

Example 5

In a 100-mL glass reaction vessel, butyl acrylate (10.0 mL, 8.94 g, 69.75 mmol) was polymerized at 70° C., using methyl 2-bromopropionate (0.195 mL, 291 mg, 1.74 mmol) as the initiator, and cuprous bromide (250 mg, 1.74 mmol) and pentamethyldiethylenetriamine as the catalyst. At the time point at which the degree of conversion reached 98%, divinylbenzene (0.87 mmol) was added and the polymerization was carried out continuedly. The course of change with time in the result of GPC analysis of samples taken from the polymerization system is shown in FIG. 1. Thus, the molecular weight distribution of the polymer varied with the lapse of time from (1-1) to (1-4). The linear polymer before addition of divinylbenzene had a number-average molecular weight of 6,000, with a molecular weight distribution of 1.38, and the final stellar polymer had a number average molecular weight of 34,000, with a molecular weight distribution of 1.57. It is seen that almost all linear polymer molecules had been converted to stellar molecules and the resulting stellar polymer was monodisperse and had a very narrow molecular weight distribution.

Industrial Applicability

According to the present invention, it is possible to obtain polymers having extended chains or a stellar structure from various radical-polymerizable monomers while the structure is controlled with ease. Similar functional group-terminated polymers can also be obtained. The polymers of the present invention also has characteristics such as their narrow molecular weight distribution. A curable composition can be prepared from such a hydroxyl-terminated polymer and a compound having, in each molecule, not less than two functional groups reactive with the hydroxyl group.

What is claimed is:

1. A method of producing a stellar polymer which comprises polymerizing a vinyl monomer in the manner of living radical polymerization and adding a compound having two or more polymerizable carbon-carbon double bonds at the end of the polymerization to obtain a stellar polymer.

2. The method according to claim 1, wherein the compound having two or more polymerizable carbon-carbon double bonds is a compound represented by a chemical formula selected from the group consisting of general formulas 1, 2 and 3 shown below:

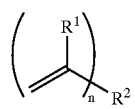 (1)

wherein $R^1$ is a group selected from the group consisting of Ph, CN, and $CO_2R^3_4R^3$ being a monovalent organic group, $R^2$ is an organic group having a valency of not less than two and n is an integer of not less than 2;

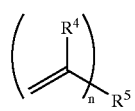 (2)

wherein $R^4$ is H, Me or a group selected from the group consisting of organic groups containing 1 to 20 carbon atoms, $R^5$ is a benzene or naphthalene group having two or more substituted groups and n is an integer of 2 or more;

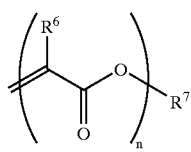 (3)

where $R^6$ is H, Me, CN or a group selected from the group consisting of organic groups containing 1 to 20 carbon atoms $R^7$ is an organic group having a valency of not less than two and n is an integer of not less than 2.

3. The method according to claim 1 wherein a polymerizable olefinic monomer is selected from the group consisting of (meth) acrylic monomers, acrylonitrile monomers, aromatic vinyl monomers, fluorine-containing vinyl monomers and silicon-containing vinyl monomers.

4. The method according to claim 1, wherein the living radical polymerization is atom transfer radical polymerization.

5. The method according to claim 4, wherein a metal complex as a catalyst for atom transfer radical polymerization is a complex of copper, nickel, ruthenium or iron.

6. The method according to claim 4, wherein a compound having a polymerization-initiating functional group and another functional group is used us an initiator for atom transfer radical polymerization.

7. The method according to claim 6, wherein the functional group of the functional group-containing initiator is a hydroxyl group.

8. The method according to claim 6, wherein the functional group of the functional group-containing initiator is a crosslinking silyl group.

9. The method according to claim 1, wherein the compound having two or more polymerizable carbon-carbon double bonds, which is to be added, is divinylbenzene or diisopropenylbenzene.

10. The method according to claim 1, wherein the polymer to be produced by living radical polymerization prior to the addition of the compound having two or more polymerizable carbon-carbon double bonds is a block copolymer.

11. The method according to claim 1, wherein the molecular weight of the resulting polymer is not less than twice as compared with the molecular weight before the addition of the compound having two or more polymerizable carbon-carbon double bonds.

12. The method according to claim 1, wherein the molecular weight distribution of the resulting polymer is not more than 2.

13. The method for producing according to claim 2, wherein a polymerizable olefinic monomer is selected from the group consisting of (meth) acrylic monomers, acrylonitrile monomers, aromatic vinyl monomers, fluorine-containing vinyl monomers and silicon-containing vinyl monomers.

14. The method according to claim 2, wherein the living radical polymerization is atom transfer radical polymerization.

15. The method according to claim 3, wherein the living radical polymerization is atom transfer radical polymerization.

16. The method according to claim 5, wherein a compound having a polymerization-initiating function group and another functional group is used as an initiator for atom transfer radical polymerization.

17. The method according to claim 2, wherein the compound having two or more polymerizable carbon-carbon double bonds, which is to be added, is divinylbenzene or diisopropenylbenzene.

* * * * *

UNITED STATES PATENT AND TRADEMARK OFFICE
CERTIFICATE OF CORRECTION

PATENT NO. : 6,720,395 B2
DATED : April 13, 2004
INVENTOR(S) : Yoshiki Nakagawa

It is certified that error appears in the above-identified patent and that said Letters Patent is hereby corrected as shown below:

Column 19,
Line 9, "$CO_2R^3_4R^3$" should be replaced with -- $CO_2R^3,R^3$ --.
Line 31, "where" should be replaced with -- wherein --.

Signed and Sealed this

Ninth Day of November, 2004

JON W. DUDAS
*Director of the United States Patent and Trademark Office*